(12) United States Patent
Simmons et al.

(10) Patent No.: US 11,396,870 B2
(45) Date of Patent: Jul. 26, 2022

(54) RECIPROCATING FLUID PUMP INCLUDING AT LEAST ONE MAGNET ON A SPOOL OF A SHUTTLE VALVE

(71) Applicant: White Knight Fluid Handling Inc., Kamas, UT (US)

(72) Inventors: David M. Simmons, Francis, UT (US); Geoffrey White, Heber, UT (US); Tom M. Simmons, Kamas, UT (US)

(73) Assignee: White Knight Fluid Handling Inc., Kamas, UT (US)

( * ) Notice: Subject to any disclaimer, the term of this patent is extended or adjusted under 35 U.S.C. 154(b) by 20 days.

(21) Appl. No.: 16/849,770

(22) Filed: Apr. 15, 2020

(65) Prior Publication Data

US 2020/0332793 A1 Oct. 22, 2020

Related U.S. Application Data

(60) Provisional application No. 62/836,551, filed on Apr. 19, 2019.

(51) Int. Cl.
*F04B 53/10* (2006.01)
*F04B 19/22* (2006.01)
(Continued)

(52) U.S. Cl.
CPC ........ *F04B 53/109* (2013.01); *F04B 53/1082* (2013.01); *F04B 9/1222* (2013.01);
(Continued)

(58) Field of Classification Search
CPC ...... F04B 53/109; F04B 9/1222; F04B 9/124; F04B 9/1253; F04B 9/129
See application file for complete search history.

(56) References Cited

U.S. PATENT DOCUMENTS

| 2,811,979 A | 11/1957 | Presnell |
| 2,960,971 A | 11/1960 | Tear |

(Continued)

FOREIGN PATENT DOCUMENTS

| DE | 1110970 B | 7/1961 |
| DE | 4000071 A1 | 7/1991 |

(Continued)

OTHER PUBLICATIONS

European Extended Search Report and Opinion for European Application No. 20169079.9, dated Sep. 24, 2020, 10 pages.

(Continued)

*Primary Examiner* — Nathan C Zollinger
*Assistant Examiner* — Timothy P Solak
(74) *Attorney, Agent, or Firm* — TraskBritt

(57) ABSTRACT

A reciprocating fluid pump may include a pump body, one or more subject fluid chambers within the pump body, one or more drive fluid chambers within the pump body, and a shuttle valve for shifting flow of pressurized drive fluid between two or more conduits. The shuttle valve includes a valve body and a spool disposed within the valve body and configured to move between a first position and a second position within the valve body. The shuttle valve also includes one or more magnets carried by the spool. The magnets are located and configured to impart a force on the spool responsive to a magnetic field such that the spool is magnetically biased away from an intermediate position between the first position and the second position.

20 Claims, 6 Drawing Sheets

(51) Int. Cl.
  *F04B 9/133* (2006.01)
  *F04B 17/00* (2006.01)
  *F16K 31/06* (2006.01)
  *F04B 9/12* (2006.01)

(52) U.S. Cl.
  CPC .............. *F04B 9/133* (2013.01); *F04B 17/00* (2013.01); *F04B 19/22* (2013.01); *F16K 31/061* (2013.01)

(56) References Cited

U.S. PATENT DOCUMENTS

| | | | |
|---|---|---|---|
| 3,202,886 A | | 8/1965 | Kramer |
| 3,203,447 A | | 8/1965 | Bremner et al. |
| 3,465,686 A | * | 9/1969 | Nugier .................. F01L 25/08 417/403 |
| 5,222,876 A | * | 6/1993 | Budde .................. F01L 25/08 417/393 |
| 5,325,762 A | | 7/1994 | Walsh et al. |
| 5,394,131 A | | 2/1995 | Lungu |
| 7,448,411 B2 | | 11/2008 | Friedman et al. |
| 7,587,897 B2 | | 9/2009 | Strong |
| 7,603,854 B2 | | 10/2009 | Strong |
| 7,603,855 B2 | | 10/2009 | Strong |
| 8,622,720 B2 | | 1/2014 | Simmons et al. |
| 8,636,484 B2 | | 1/2014 | Simmons et al. |
| 9,989,164 B1 | * | 6/2018 | Jensen ................ F16K 11/0704 |
| 2007/0228309 A1 | * | 10/2007 | Friedman .............. F16K 11/044 251/65 |
| 2008/0127946 A1 | * | 6/2008 | Jeter ...................... F04B 9/125 123/51 R |
| 2008/0250918 A1 | | 10/2008 | Strong |
| 2010/0178184 A1 | | 7/2010 | Simmons et al. |
| 2012/0063924 A1 | * | 3/2012 | Simmons .............. F04B 35/045 417/53 |

FOREIGN PATENT DOCUMENTS

| | | |
|---|---|---|
| GB | 8985650 A | 6/1962 |
| JP | 08-135839 A | 5/1996 |
| WO | 2019/186377 A1 | 10/2019 |

OTHER PUBLICATIONS

European Communication pursuant to Article 94(3) EPC for European Application No. 20169079.9, dated Jun. 18, 2021, 6 pages.
Korean Notice of Reasons for Rejection for Korean Application No. 10-2020-0046388, dated May 10, 2021, 14 pages with English translation.
Taiwanese Office Action from Taiwanese Application No. 109113018, dated May 5, 2021, 15 pages (with English Translation).
Taiwanese Search Report and Office Action from Taiwanese Application No. 109113018, dated Dec. 9, 2020, 15 pages (With English Translation).
Korean Notice of Final Rejection for Korean Application No. 10-2020-0046388, dated Nov. 23, 2021, 7 pages with English translation.
Chinese First Office Action for Chinese Application No. 202010312987.6, dated Oct. 11, 2021, 17 pages with translation.
Japanese Notice of Reasons for Refusal for Japanese Application No. 2020-073397, dated Aug. 11, 2021, 14 pages with English translation.
Japanese Notice of Reasons for Refusal for Japanese Application No. 2020-073397, dated Mar. 23, 2022, 6 pages with English translation.

* cited by examiner

RECIPROCATING FLUID PUMP INCLUDING AT LEAST ONE MAGNET ON A SPOOL OF A SHUTTLE VALVE

CROSS-REFERENCE TO RELATED APPLICATION

This application claims the benefit under 35 U.S.C. § 119(e) of U.S. Provisional Patent Application Ser. No. 62/836,551, filed Apr. 19, 2019, the disclosure of which is hereby incorporated herein in its entirety by this reference.

TECHNICAL FIELD

The present disclosure relates generally to reciprocating fluid pumps that include a reciprocating plunger. More particularly, embodiments of the present disclosure relate to reciprocating devices (e.g., pumps, valves, etc.) including magnets, and to related assemblies, systems, and methods.

BACKGROUND

Reciprocating fluid pumps are used in many industries. Reciprocating fluid pumps generally include two fluid chambers in a pump body. A reciprocating piston or shaft is driven back and forth within the pump body. One or more plungers (e.g., diaphragms or bellows) may be connected to the reciprocating piston or shaft. As the reciprocating piston moves in one direction, the movement of the plungers results in fluid being drawn into a first fluid chamber of the two fluid chambers and expelled from the second chamber. As the reciprocating piston moves in the opposite direction, the movement of the plungers results in fluid being expelled from the first chamber and drawn into the second chamber. A chamber inlet and a chamber outlet may be provided in fluid communication with the first fluid chamber, and another chamber inlet and another chamber outlet may be provided in fluid communication with the second fluid chamber. The chamber inlets to the first and second fluid chambers may be in fluid communication with a common single pump inlet, and the chamber outlets from the first and second fluid chambers may be in fluid communication with a common single pump outlet, such that fluid may be drawn into the pump through the pump inlet from a single fluid source, and fluid may be expelled from the pump through a single pump outlet. Check valves may be provided at the chamber inlet and outlet of each of the fluid chambers to ensure that fluid can only flow into the fluid chambers through the chamber inlets, and fluid can only flow out of the fluid chambers through the chamber outlets.

BRIEF SUMMARY

Various embodiments may include a reciprocating fluid pump including a pump body, one or more subject fluid chambers within the pump body, one or more drive fluid chambers within the pump body, and a shuttle valve for shifting flow of pressurized drive fluid between two or more conduits, at least one conduit of the two or more conduits leading to the at least one drive fluid chamber. The shuttle valve includes a valve body and a spool disposed within the valve body and configured to move between a first position and a second position within the valve body. The shuttle valve also includes one or more magnets carried by the spool. The magnets are located and configured to impart a force on the spool responsive to a magnetic field such that the spool is magnetically biased away from an intermediate position between the first position and the second position.

Another embodiment of the present disclosure may be a reciprocating fluid pump including a shuttle valve including a valve body and a spool disposed within the valve body and configured to move between a first position and a second position within the valve body. The shuttle valve also includes a positioning magnet assembly proximate a longitudinal end of the valve body. The positioning magnet assembly may include a permanent magnet carried by the spool and one or more stationary magnetic devices on the valve body. The permanent magnet is configured to interact with the stationary magnetic devices to generate a force on the spool in a direction along a longitudinal axis of the valve body such that that the spool is unstable when located at a midpoint between the first position and the second position.

Another embodiment of the present disclosure may be a method of operating a shuttle valve of a reciprocating fluid pump including providing a magnetic field between a valve body of the shuttle valve and a spool disposed within the valve body and configured to move between a first position and a second position within the valve body, and imparting a force to the spool using the magnetic field such that the spool is magnetically biased away from an intermediate position between the first position and the second position.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
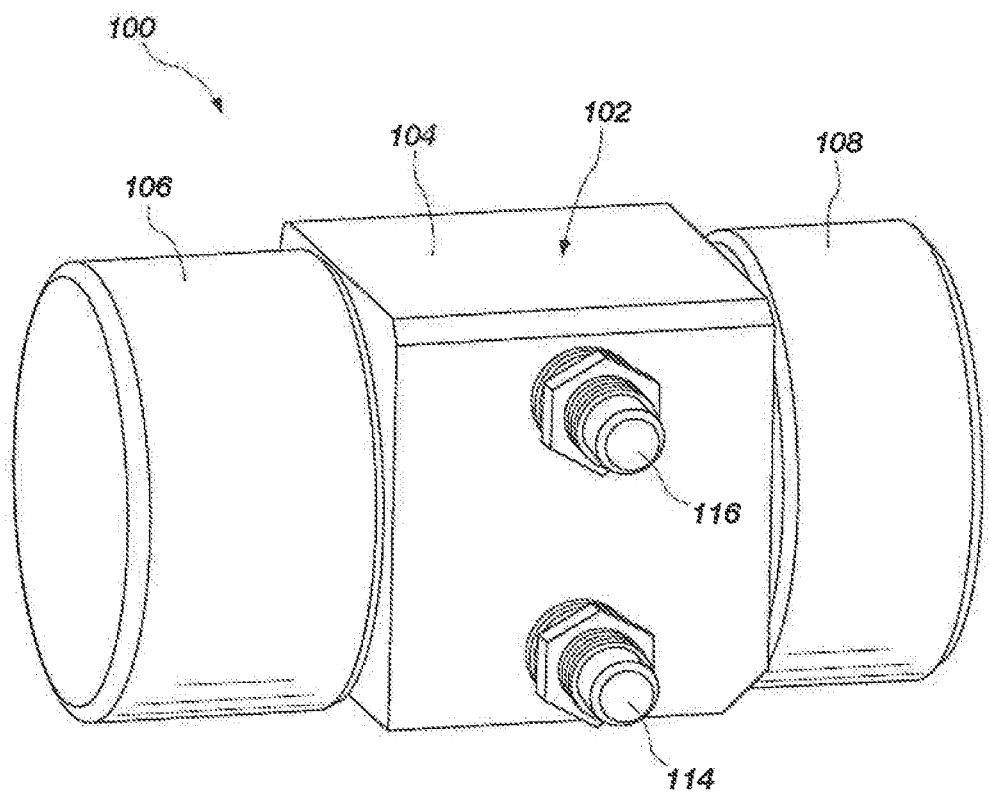
FIG. 1 is a perspective view of a reciprocating fluid pump according to an embodiment of the present disclosure.

The illustrations presented herein are not meant to be actual views of any particular reciprocating fluid pump or component thereof, but are merely idealized representations employed to describe illustrative embodiments of the present disclosure. The drawings are not necessarily to scale. Additionally, elements common between figures may retain the same numerical designation.

As used herein, any relational term, such as "first," "second," "over," "top," "bottom," "lowermost," "overlying," "underlying," etc., is used for clarity and convenience in understanding the disclosure and accompanying drawings and does not connote or depend on any specific preference, orientation, or order, except where the context clearly indicates otherwise.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even 100% met.

As used herein, the term "magnet" means and includes any object or device that produces a magnetic field. Magnets include permanent magnets and electromagnetic devices.

As used herein, the phrase "permanent magnet" means and includes any object or device comprising a material that is magnetized and creates its own persistent magnetic field.

As used herein, the phrase "electromagnetic device" means and includes any device used to generate a magnetic field by flowing electrical current through a conductive wire or other structure.

As used herein, the term "magnetic material" means and includes any material that alters and/or responds to a magnetic field proximate to the magnetic material. For example, a "magnetic material" may comprise ferromagnetic materials, ferrimagnetic materials, antiferromagnetic, and paramagnetic materials.

As used herein, the phrase "non-magnetic material" means and includes any material that does not alter and/or respond to a magnetic field proximate to the non-magnetic material.

As used herein, the terms "proximate" and "adjacent," when referencing a location of a magnetic field with respect to a magnet carried by a movable element, mean and include a distance within which a magnet associated with the movable element imparts a perceptible motive force to that element.

Reciprocating fluid pumps may include shuttle valves to facilitate driving the pumping action of such pumps. In operation, a shuttle spool may be moved back and forth within a shuttle valve body by applying positive pressure to one longitudinal end surface of the shuttle spool while ambient (atmospheric) pressure is provided to the opposite longitudinal end surface of the shuttle spool. As the shuttle spool moves into one of two operational positions, any fluid (e.g., a gas, such as air) adjacent an end of the shuttle spool and within a shift-shuttle conduit may be vented to ambient through a shuttle valve vent conduit. Shuttle valves may be susceptible to stalling when a shuttle spool stops unintentionally at an intermediate position between the two operational positions thereof (at longitudinal ends of a bore within a shuttle valve body), such that drive fluid is either precluded from passing from a drive fluid conduit through the shuttle valve body to either of two drive chamber conduits, or such that drive fluid flows from the drive fluid conduit through the shuttle valve body to each of the two drive chamber conduits in an at least substantially equal manner. By using one or more magnets to destabilize the shuttle spool when located at a center position (or other stall positions), occurrences of such stalling may be reduced or at least substantially eliminated. For example, a magnet may be located, oriented, and configured to bias the shuttle spool away from the center position (e.g., midpoint) within the shuttle valve body responsive to the proximate magnetic fields provided by one or more additional magnets. In particular, when two or more magnets are centered resulting in a zero net force, the shuttle spool may be located below the center position and when the shuttle spool is centered the magnets may be offset longitudinally along a longitudinal axis of the shuttle spool to provide a repulsive force therebetween to deter (e.g., prevent) the shuttle spool from stalling at the center position.

FIG. 1 illustrates an embodiment of a reciprocating fluid pump 100 of the disclosure. In some embodiments, the reciprocating fluid pump 100 is configured to pump a subject fluid, such as, for example, a liquid (e.g., water, oil, acid, etc.), gas, or powdered substance, using a pressurized drive fluid such as, for example, compressed gas (e.g., air). Thus, in some embodiments, the reciprocating fluid pump 100 may comprise a pneumatically operated liquid pump.

The reciprocating fluid pump 100 includes a pump body 102, which may comprise two or more components that may be assembled together to form the pump body 102. For example, the pump body 102 may include a center body 104, a first end piece 106 that may be attached to the center body 104 on a first side thereof, and a second end piece 108 that may be attached to the center body 104 on an opposite, second side thereof. The reciprocating fluid pump 100 includes a subject fluid inlet 114 and a subject fluid outlet 116. During operation of the reciprocating fluid pump 100, subject fluid may be drawn into the reciprocating fluid pump 100 through the subject fluid inlet 114 and expelled out from the reciprocating fluid pump 100 through the subject fluid outlet 116. Operation of such shuttle valves in conjunction with operation of the reciprocating fluid pump 100 is described in detail, for example, in U.S. Pat. No. 8,622,720, issued Jan. 7, 2014 and in U.S. Pat. No. 8,636,484, issued Jan. 28, 2014, the disclosure of each of which is incorporated herein in its entirety by this reference.

Figure 2A:
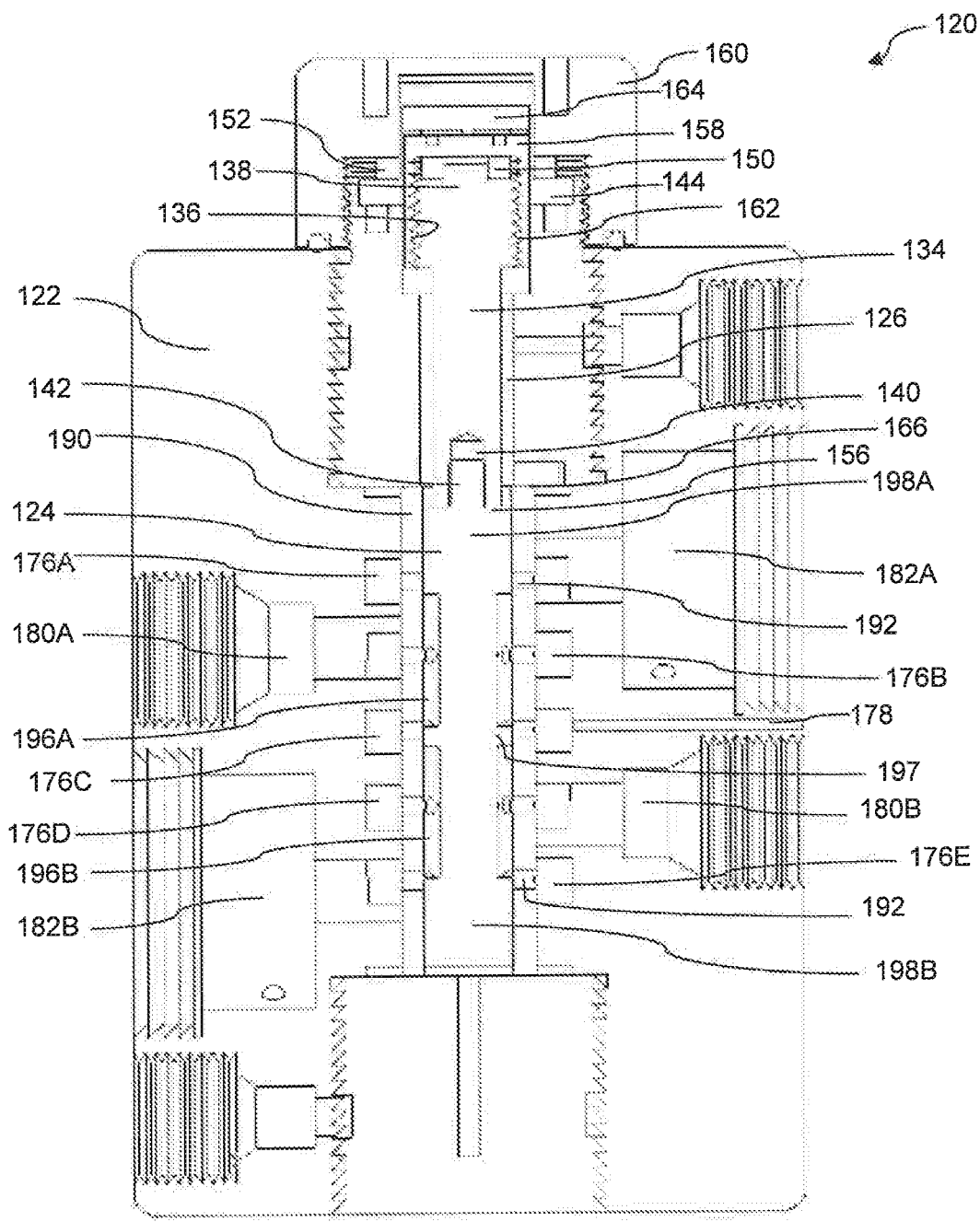
FIG. 2A is a schematically illustrated cross-sectional view of a shuttle valve including a shuttle spool that may be used in conjunction with the reciprocating fluid pump illustrated in FIG. 1.

FIG. 2A illustrates a shuttle valve 120 that may be used in conjunction with the reciprocating fluid pump 100 of FIG. 1. As described in greater detail in U.S. Pat. No. 8,622,720, the pump body 102 may include therein a first cavity and a second cavity. A first plunger may be disposed within the first cavity, and a second plunger may be disposed within the second cavity. Each of the plungers may comprise, for example, a diaphragm or a bellows, such that the plungers may be longitudinally extended and compressed as the reciprocating fluid pump 100 is cycled during operation thereof. For example, the first plunger may divide the first cavity into a first subject fluid chamber on a first side of the first plunger and a first drive fluid chamber on an opposite, second side of the first plunger. Similarly, the second plunger may divide the second cavity into a second subject fluid chamber on a first side of the second plunger and a second drive fluid chamber on an opposite, second side of the second plunger. The reciprocating fluid pump 100 may comprise a shifting mechanism for shifting the flow of pressurized drive fluid back and forth between the first drive fluid chamber and the second drive fluid chamber. The shifting mechanism may comprise, for example, one or more shift pistons and the shuttle valve 120.

As shown in FIG. 2A, the shuttle valve 120 includes a shuttle valve body 122, and a shuttle spool 124 disposed within a bore extending at least partially through the shuttle valve body 122. A control rod 134 may be attached to an upper surface of the shuttle spool 124 such that the control rod 134 moves with (e.g., is carried by) the shuttle spool 124 as the shuttle spool 124 moves (e.g., longitudinally) between a first position and a second position within the shuttle valve body 122. The control rod 134 may include threads 136 proximate an upper end thereof and a protrusion 138 on an upper surface of the control rod 134 proximate the threads 136. The control rod 134 also includes a recess 140 at a lower end thereof, opposite the upper end including the protrusion 138. The shuttle spool 124 includes a protrusion 142 on an upper surface thereof that is configured to extend into and be secured within the recess 140 of the control rod 134, as shown in FIG. 2A. A dimension (e.g., a diameter) of the protrusion 142 may be less than that of the shuttle spool 124 such that the shuttle spool 124 includes a shoulder region 156 adjacent to (e.g., surrounding) the protrusion 142. At least a portion of the shoulder region 156 supports the lower end of the control rod 134. Further, an outer portion of the shoulder region 156 may extend beyond a lateral extent of the control rod 134.

A support structure 144 may optionally be located on the longitudinal end of the shuttle valve body 122 proximate to and at least partially enclosing the upper end of the control rod 134. An inner cap 158 may be attached to the upper end of the control rod 134. For example, threads 162 of the inner cap 158 may be configured to engage the threads 136 of the control rod 134. At least a portion of the inner cap 158 may be located between the support structure 144 and the control rod 134. Further, an outer cap 160 may be positioned over the support structure 144 as well as the inner cap 158 and the upper end of the control rod 134. In particular, at least a portion of the support structure 144 and the inner cap 158 may be positioned with a recess 164 of the outer cap 160, as shown in FIG. 2A. The outer cap 160 may be attachable to (e.g., threadably engaged with) the shuttle valve body 122 or with optional components (e.g., threaded inserts, etc.) thereof and may be sealed to the shuttle valve body 122 using sealing members (e.g., O-rings) or the like. Some of the components (e.g., the shuttle valve 120 and the control rod 134) may be located within a central cavity 126 of the shuttle valve body 122. In some embodiments, an upper portion of the central cavity 126 may have a greater dimension (e.g., diameter) than a lower portion thereof. In such an embodiment, a shoulder region 166 of the shuttle valve body 122 may define a lower boundary of the upper portion of the central cavity 126.

Magnetic devices (e.g., magnets) may be provided within or proximate to (e.g., attached to components of) the shuttle valve body 122 of the shuttle valve 120. Such magnetic devices may be included within an assembly of magnetic devices (e.g., a positioning magnet assembly) and may include, for example, a first magnetic device 150 (e.g., a magnet) and a second magnetic device 152 (e.g., another magnet), as shown in FIG. 2. Additional magnetic devices may also be included as described in greater detail below with reference to FIGS. 3A through 3D.

The first magnetic device 150 may be carried by the shuttle spool 124 and may be located on the upper end of the control rod 134. In particular, the first magnetic device 150 may be located, oriented, and configured to impart a force on the shuttle spool 124 responsive to a proximate magnetic field. In some embodiments, the first magnetic device 150 may be an annular magnet (e.g., ring magnet) having a central aperture. The first magnetic device 150 may be located on the control rod 134 with the central aperture thereof being centered around the protrusion 138 of the control rod 134. The second magnetic device 152 is located within the shuttle valve body 122 or a component thereof proximate a longitudinal end of the shuttle valve body 122 corresponding to an end of the shuttle spool 124 in which the first magnetic device is located. For example, the second magnetic device 152 may be located within the recess 164 of the outer cap 160. In some embodiments, the second magnetic device 152 may also be an annular magnet and may be positioned between a lower surface of the outer cap 160 and an upper surface of the support structure 144. Further, the second magnetic device 152 may be larger in diameter than that of the first magnetic device 150 and may encircle the first magnetic device 150 as well as a portion of the inner cap 158 enclosing the first magnetic device 150, as shown in FIG. 2A. Thus, the second magnetic device 152 may be separated from the first magnetic device 150 by a distance. In some embodiments, a non-magnetic material, such as a polymer, may be disposed between the first magnetic device 150 and the second magnetic device 152. In other embodiments, the second magnetic device 152 may comprise an electromagnetic device.

With continued reference to FIG. 2A, five recesses 176A-176E may be provided in a wall of the shuttle valve body 122 within the bore in which the shuttle spool 124 is located. Each of the five recesses 176A-176E may comprise a substantially continuous annular recess that extends around the bore in the shuttle valve body 122 in which the shuttle spool 124 is disposed. Thus, each of the five recesses 176A-176E can be seen in the cross-sectional view of FIG. 2A on the left and right sides of the shuttle spool 124 (from the perspective of FIG. 2A). A fluid conduit may lead through the shuttle valve body 122 to each of the five recesses 176A-176E, respectively.

A drive fluid conduit 178 may lead to the middle, third recess 176C, as shown in FIG. 2A. Thus, a pressurized drive fluid may be supplied to the third recess 176C from a pressurized source of drive fluid (e.g., a source of compressed gas, such as compressed air). A first drive chamber conduit 180A may extend between the second recess 176B and a first drive fluid chamber of the reciprocating fluid pump 100 (FIG. 1), and a second drive chamber conduit 180B may extend between the fourth recess 176D and a second drive fluid chamber of the reciprocating fluid pump 100.

A first shuttle valve vent conduit 182A may extend from the first recess 176A to the exterior of the shuttle valve body 122, and a second shuttle valve vent conduit 182B may extend from the fifth recess 176E to the exterior of the shuttle valve body 122. These first and second shuttle valve vent conduits 182A, 182B are illustrated in FIG. 2A as threaded receptacles. Mufflers or other fluid conduits optionally may be coupled to the first and second shuttle valve vent conduits 182A, 182B by way of such threaded receptacles.

As shown in FIG. 2A, a cylindrical insert 190 may be disposed between the shuttle spool 124 and the five recesses 176A-176E in the wall of the shuttle valve body 122 within the bore in which the shuttle spool 124 is disposed. The cylindrical insert 190 may comprise one or more holes 192 that extend through the cylindrical insert 190 in each plane transverse to the longitudinal axis of the shuttle spool 124 that is aligned with one of the five recesses 176A-176E. Thus, fluid communication is provided between the interior of the cylindrical insert 190 and each of the recesses 176A-176E through the holes 192 in the cylindrical insert 190. Furthermore, a plurality of annular sealing members (e.g., O-rings) (not shown) optionally may be provided between the outer cylindrical surface of the cylindrical insert 190 and the adjacent wall of the shuttle valve body 122 within the bore in which the shift piston is disposed to eliminate fluid communication between any of the recesses 176A-176E through any space between the cylindrical insert 190 and the shuttle valve body 122.

The shuttle spool 124 comprises a first annular recess 196A in the outer surface of the shuttle spool 124 and a second annular recess 196B in the outer surface of the shuttle spool 124. The first annular recess 196A and the second annular recess 196B are separated by a central annular ridge 197 on the outer surface of the shuttle spool 124. Furthermore, an annular first end ridge 198A is provided on the outer surface of the shuttle spool 124 on a longitudinal side of the first annular recess 196A opposite the central annular ridge 197, and an annular second end ridge 198B is provided on the outer surface of the shuttle spool 124 on a longitudinal side of the second annular recess 196B opposite the central annular ridge 197. Further, the protrusion 142 of the shuttle spool 124 extends from the annular first end ridge 198A in a direction opposite that of the annular first end ridge 198A.

Each of the first annular recess 196A and the second annular recess 196B have a length (e.g., a dimension generally parallel to the longitudinal axis of the shuttle spool 124) that is long enough to at least partially longitudinally overlap two adjacent recesses of the five recesses 176A-176E. For example, when the shuttle spool 124 is in the position shown in FIG. 2A, the first annular recess 196A extends to and at least partially overlaps with each of the second recess 176B and the third recess 176C, and the second annular recess 196B extends to and at least partially overlaps with each of the fourth recess 176D and the fifth recess 176E. In some embodiments, fluid communication may be provided between the drive fluid conduit 178 and the first drive chamber conduit 180A through the third recess 176C, the holes 192 in the cylindrical insert 190 aligned with the third recess 176C, the first annular recess 196A in the shuttle spool 124, the holes 192 in the cylindrical insert 190 aligned with the second recess 176B, and the second recess 176B. Also in this configuration, fluid communication is provided between the second drive chamber conduit 180B and the second shuttle valve vent conduit 182B through the fourth recess 176D, the holes 192 in the cylindrical insert 190 aligned with the fourth recess 176D, the second annular recess 196B in the shuttle spool 124, the holes 192 in the cylindrical insert 190 aligned with the fifth recess 176E, and the fifth recess 176E.

Returning again to FIG. 2A, each of the first and second magnetic devices 150, 152 may comprise, for example, a permanent magnet at least substantially comprised of a magnetic material. The magnetic material may comprise, for example, a rare earth element (e.g., each of the first and second magnetic devices 150, 152 may comprise a permanent rare earth magnet). As non-limiting examples, the magnetic material may comprise at least one of a samarium cobalt alloy and a neodymium iron alloy. In some embodiments, at least one (e.g., each) of the first and second magnetic devices 150, 152 may comprise an electromagnetic device. In some embodiments, the shuttle valve body 122 and the shuttle spool 124, with the exception of the first and second magnetic devices 150, 152, may be at least substantially comprised of a non-magnetic material such as a polymer and/or a non-magnetic metal. By way of example and not limitation, such a polymer may comprise one or more of a fluoropolymer, neoprene, buna-N, ethylene diene M-class (EPDM), VITON®, polyurethane, HYTREL®, SANTOPRENE®, fluorinated ethylene-propylene (FEP), perfluoroalkoxy fluorocarbon resin (PFA), ethylene-chloro-trifluoroethylene copolymer (ECTFE), ethylene-tetrafluoro-ethylene copolymer (ETFE), nylon, polyethylene, polyvinylidene fluoride (PVDF), NORDEL™, and nitrile. By way of example and not limitation, such a non-magnetic metal may comprise one or more of a stainless steel, INCONEL®, MONEL®, HASTELLOY®, a high nickel alloy, brass, copper, bronze, aluminum, and zinc.

The first and second magnetic devices 150, 152 may be located, oriented, and configured to impart a force on the shuttle spool 124 responsive to a proximate magnetic field as the shuttle spool 124 slides back and forth within the shuttle valve body 122. In particular, the first magnetic device 150 may be located, oriented, and configured to bias the shuttle spool 124 away from a center position (e.g., a midpoint) of two opposing positions within the shuttle valve body 122 responsive to the proximate magnetic fields provided by the second magnetic device 152.

For example, the first magnetic device 150 carried by the shuttle spool 124 and the second magnetic device 152 disposed within the shuttle valve body 122 may be located along and centered about a common axis along which the shuttle spool 124 slides during operation thereof, and may be oriented such that the polarity of the first magnetic device 150 is opposite the polarity of the second magnetic device 152. In other words, the magnetic moment vector of the first magnetic device 150 may extend in a direction opposite to the magnetic moment vector of the second magnetic device 152. Further, the magnetic moment vector of the first magnetic device 150 may be parallel to and aligned along a common axis (e.g., the axis along which the shuttle spool 124 slides) with the magnetic moment vector of the second magnetic device 152. In this configuration, a repulsive force will be applied between the first magnetic device 150 and the second magnetic device 152, the magnitude of which will increase as the first magnetic device 150 and the second magnetic device 152 are brought into proximity with one another during operation of the shuttle valve 120. The second magnetic device 152 may be disposed in a fixed location within the shuttle valve body 122 or a component thereof such that the second magnetic device 152 does not move during operation of the shuttle valve 120. Thus, as the first magnetic device 150 is carried by the shuttle spool 124, the force applied to the first magnetic device 150 by the proximate magnetic field of the second magnetic device 152 will be translated and applied to the shuttle spool 124. As a result, a force will be applied to the shuttle spool 124 by the proximate magnetic field of the second magnetic device 152 that urges the shuttle spool 124 to slide away from a center position and toward one of the first position or the second position.

Alternatively, the first magnetic device 150 carried by the shuttle spool 124 and the second magnetic device 152 disposed within the shuttle valve body 122 or a component thereof may be oriented such that the polarity of the first magnetic device 150 is the same as the polarity of the second magnetic device 152. In other words, the magnetic moment vector of the first magnetic device 150 may extend in the same direction in which the magnetic moment vector of the second magnetic device 152 extends. Further, the magnetic moment vector of the first magnetic device 150 may be parallel to and aligned along the common axis with the magnetic moment vector of the second magnetic device 152. In this configuration, an attractive force will be applied between the first magnetic device 150 and the second magnetic device 152, the magnitude of which will increase as the first magnetic device 150 and the second magnetic device 152 are brought into proximity with one another during operation of the shuttle valve 120. Thus, as the first magnetic device 150 is carried by the shuttle spool 124, the force applied to the first magnetic device 150 by the proximate magnetic field of the second magnetic device 152 will be translated and applied to the shuttle spool 124. As a result, a force will be applied to the shuttle spool 124 by the proximate magnetic field of the second magnetic device 152 that urges the shuttle spool 124 to slide away from the center position and toward one of the first position or the second position.

Returning again to FIG. 2A, the first magnetic device 150 and the second magnetic device 152 are centered (e.g., perfectly laterally aligned) with one another during a portion of the cycle of movement of the shuttle spool 124 within the shuttle valve body 122. In particular, when the first magnetic device 150 and the second magnetic device 152 are centered with one another, there is zero net force acting therebetween and, thus, there is no magnetic force applied to the shuttle spool 124. At this stage of the cycle, the shuttle spool 124 may be located below the center position thereof, for example. In such an embodiment, the shoulder region 156 of the shuttle spool 124 may be offset longitudinally from (e.g., below) the shoulder region 166 of the shuttle valve body 122 and, a gap exists within the recess 164 of the outer cap 160 between an upper surface of the inner cap 158 and a lower surface of the support structure 144, as shown in FIG. 2A.

Figure 2B:
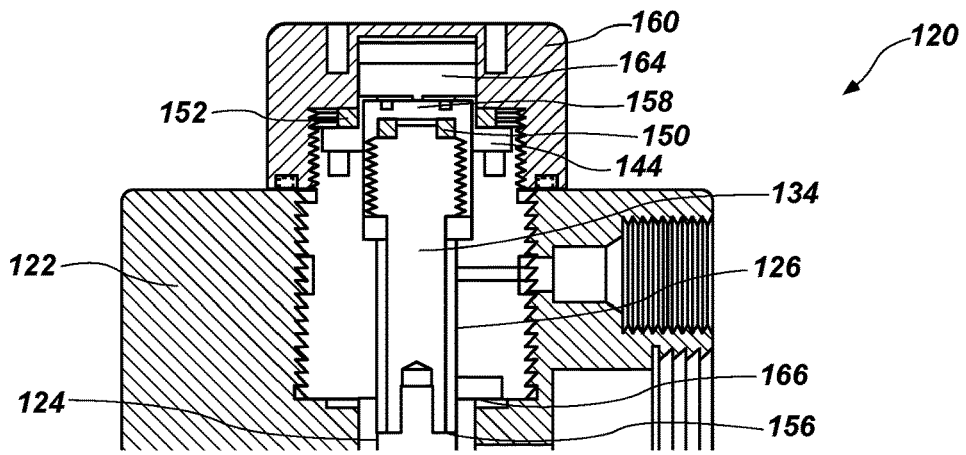
FIGS. 2B through 2D are cross-sectional views of a portion of the shuttle valve of FIG. 2A illustrating the shuttle spool shown in a variety of positions within a body of the shuttle valve.
Figure 2C:
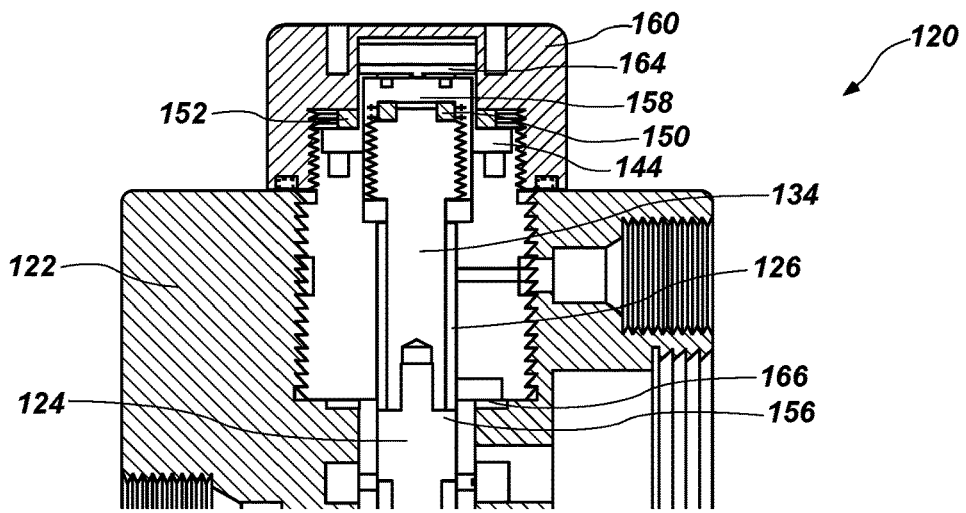
Figure 2D:
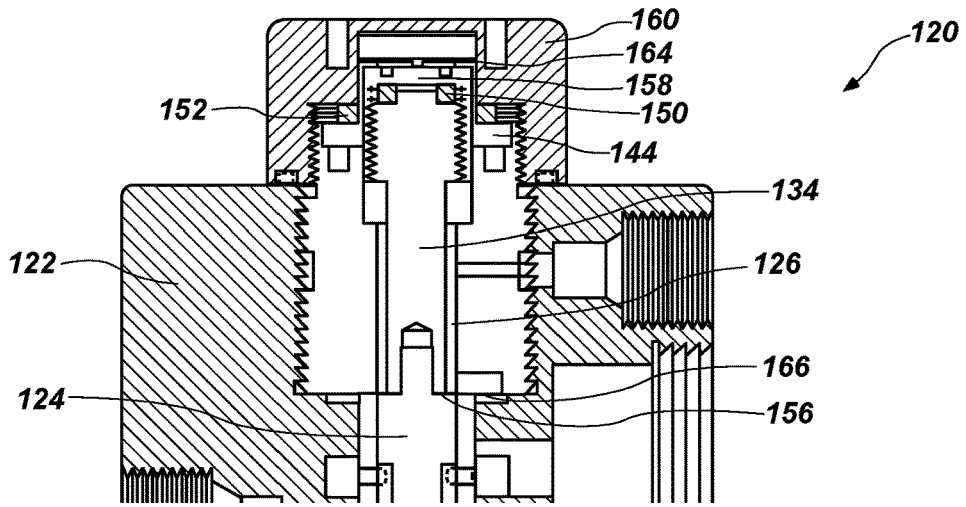

FIGS. 2B through 2D are cross-sectional views of a portion of the shuttle valve 120 of FIG. 2A illustrating the shuttle spool 124 in a variety of positions within the shuttle valve body 122 at various stages of the cycle of movement as the shuttle spool 124 slides back and forth within the shuttle valve body 122.

As shown in FIG. 2B, the first magnetic device 150 and the second magnetic device 152 may not be centered with one another when the shuttle spool 124 is down (e.g., at a lower end of the movement thereof). In particular, when the position of the first magnetic device 150 is lower than that of the second magnetic device 152, a magnetic force (e.g., repulsive force) acts therebetween, which force, in turn, is applied to the shuttle spool 124. At this stage, the shoulder region 156 of the shuttle spool 124 may be offset longitudinally from (e.g., below) the shoulder region 166 of the shuttle valve body 122 by a greater distance than that associated with the stage shown in FIG. 2A, and the gap within the recess 164 of the outer cap 160 between the upper surface of the inner cap 158 and the lower surface of the support structure 144 is increased, as shown in FIG. 2B.

As shown in FIG. 2C, the position of the first magnetic device 150 is relatively higher than that of the second magnetic device 152 when the shuttle spool 124 is at the center position. At this stage, the magnetic force acts therebetween to deter (e.g., prevent) the shuttle spool 124 from stalling at the center position. In other words, the first magnetic device 150 and the second magnetic device 152 may be used to create the magnetic force therebetween to destabilize the shuttle spool 124 when located at or proximate the center position in order to reduce (e.g., substantially eliminate) occurrences of stalling of the shuttle spool 124. At this stage, a distance between the shoulder region 156 of the shuttle spool 124 and the shoulder region 166 of the shuttle valve body 122 may be decreased, and the gap within the recess 164 of the outer cap 160 between the upper surface of the inner cap 158 and the lower surface of the support structure 144 is also decreased, as shown in FIG. 2C.

As shown in FIG. 2D, the position of the first magnetic device 150 is higher than that of the second magnetic device 152 by a greater distance when the shuttle spool 124 is above the center position (e.g., at an upper end of the movement thereof). At this stage, the magnetic force acts between the first magnetic device 150 and the second magnetic device 152, resulting in an applied force to the shuttle spool 124. At this stage, the shoulder region 156 of the shuttle spool 124 may be substantially aligned with the shoulder region 166 of the shuttle valve body 122, and the gap within the recess 164 of the outer cap 160 between the upper surface of the inner cap 158 and the lower surface of the support structure 144 is further decreased (e.g., absent), as shown in FIG. 2D.

Figure 3A:
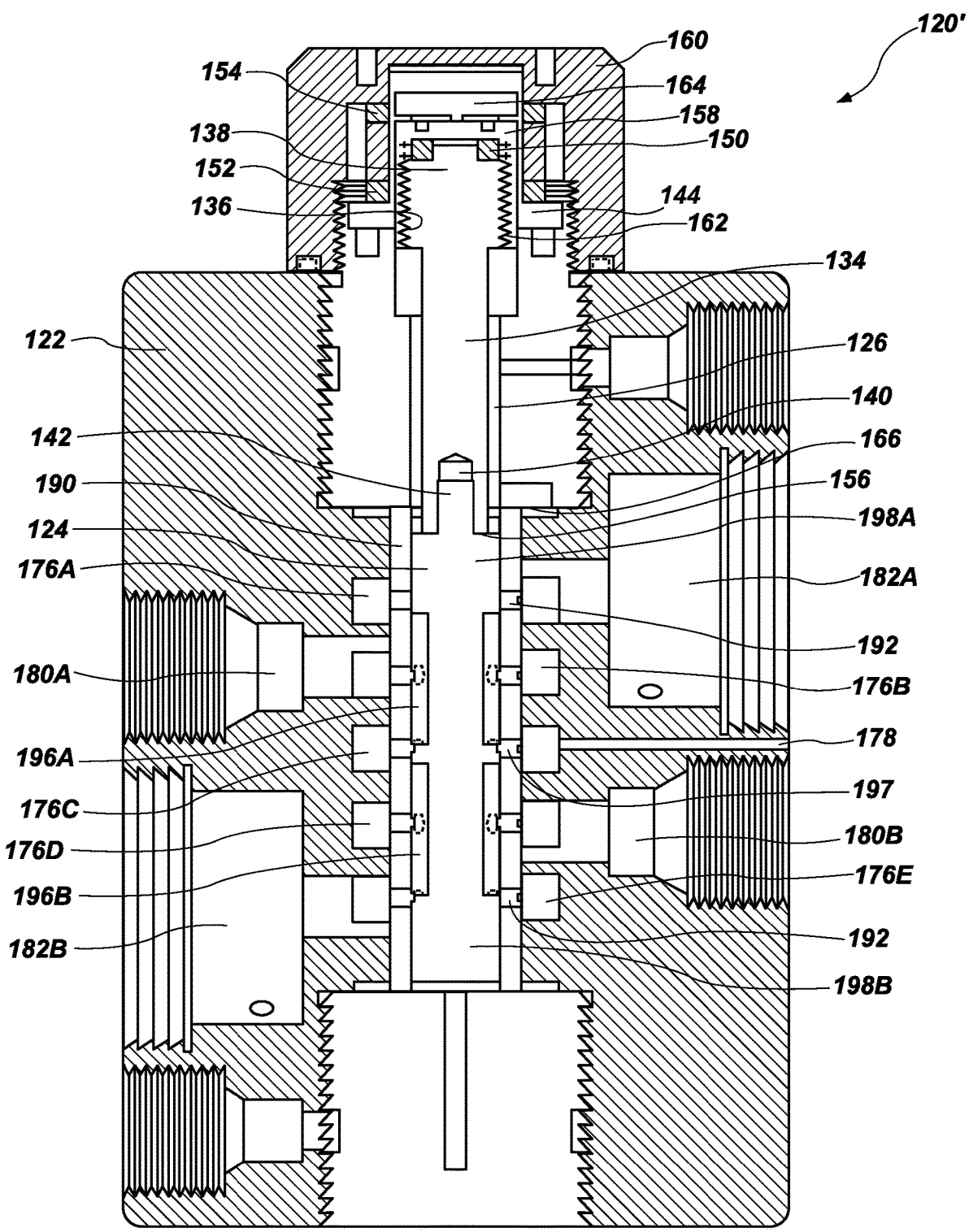
FIG. 3A is a schematically illustrated cross-sectional view of another embodiment of a shuttle valve including a shuttle spool.

FIG. 3A illustrates a cross-sectional view of another embodiment of a shuttle valve 120' that may be used in conjunction with a reciprocating fluid pump, such as the reciprocating fluid pump 100 shown in FIG. 1. Many parts, such as the conduits, recesses, ridges, and the like, are similar to (e.g., the same as) those included in the embodiment of the shuttle valve 120 of FIG. 2A, descriptions of which are not repeated here. Similar to the previous embodiment, the shuttle valve 120' includes the shuttle valve body 122, and the shuttle spool 124 disposed within a bore (e.g., the central cavity 126) extending at least partially through the shuttle valve body 122. Further, the first magnetic device 150 of shuttle valve 120' may also be carried by the shuttle spool 124 and may be located on the upper end of the control rod 134. As in the embodiment of FIG. 2A, the first magnetic device 150 may also be an annular magnet (e.g., ring magnet) having a central aperture and the first magnetic device 150 may be located on the control rod 134 with the central aperture thereof being centered around the protrusion 138 of the control rod 134. Similarly, the second magnetic device 152 may also be an annular magnet, for example, and may be positioned between a lower surface of the outer cap 160 and an upper surface of the support structure 144 within the recess 164 of the outer cap 160. The difference of the embodiment of FIG. 3A lies in a third magnetic device 154 (e.g., an additional magnet) being attached to the shuttle valve body 122 or a component thereof. In particular, the third magnetic device 154 may be of a similar (e.g., same) shape and size as that of the second magnetic device 152 and may be located above (e.g., in direct alignment with) the second magnetic device 152 along the longitudinal axis of the shuttle spool 124, for example. In such an embodiment, the third magnetic device 154 may also be located within the recess 164 of the outer cap 160. However, the third magnetic device 154 may encircle a portion of the inner cap 158 and/or a portion of the support structure 144 rather than encircling the first magnetic device 150. In particular, a position of the third magnetic device 154 may be above that of the first magnetic device 150 and a position of the second magnetic device 152 may be below that of the first magnetic device 150, as shown in the embodiment of FIG. 3A.

In addition, the third magnetic device 154 may be separated from each of the first magnetic device 150 and the second magnetic device 152 by a distance with components of the shuttle valve 120' having a non-magnetic material (e.g., a polymer) therebetween. As the shuttle spool 124 slides back and forth within the shuttle valve body 122 during operation of the shuttle valve 120', the first magnetic device 150 may not extend beyond either (e.g., each) of the second magnetic device 152 and the third magnetic device 154.

The third magnetic device 154 may also be a permanent magnet or an electromagnetic device, as described above with reference to the first magnetic device 150 and the second magnetic device 152. The first, second, and third magnetic devices 150, 152, and 154 may be located, oriented, and configured to impart a force on the shuttle spool 124 as the shuttle spool 124 moves back and forth within the shuttle valve body 122, similar to the embodiment of FIGS. 2A through 2D. For example, the first magnetic device 150 may be located, oriented, and configured to bias the shuttle spool 124 away from a center position (e.g., a midpoint) of two opposing positions within the shuttle valve body 122 responsive to the proximate magnetic fields provided by the second and third magnetic devices 152, 154. In some embodiments, each of the second magnetic device 152 and the third magnetic device 154 may be oriented such that the polarity of the first magnetic device 150 is opposite the polarity of the second and third magnetic devices 152, 154 such that a repulsive force is applied between the first magnetic device 150 and each of the second and third magnetic devices 152, 154. In other embodiments, each of the second magnetic device 152 and the third magnetic device 154 may be oriented such that the polarity of the first magnetic device 150 is the same as the polarity of the second and third magnetic devices 152, 154 such that an attractive force is applied between the first magnetic device 150 and each of the second and third magnetic devices 152, 154, for example. In yet other embodiments, at least one of (e.g., both of) the second and third magnetic devices 152, 154 may be an electromagnetic device. Of course, a person of ordinary skill in the art would recognize that any configuration (e.g., location, polarity orientation, size, shape, etc.) of the magnetic devices relative to one another may be selected in order to provide both a direction and a magnitude of such a magnetic force that acts therebetween to deter (e.g., prevent) the shuttle spool 124 from stalling at the center position.

Figure 3B:
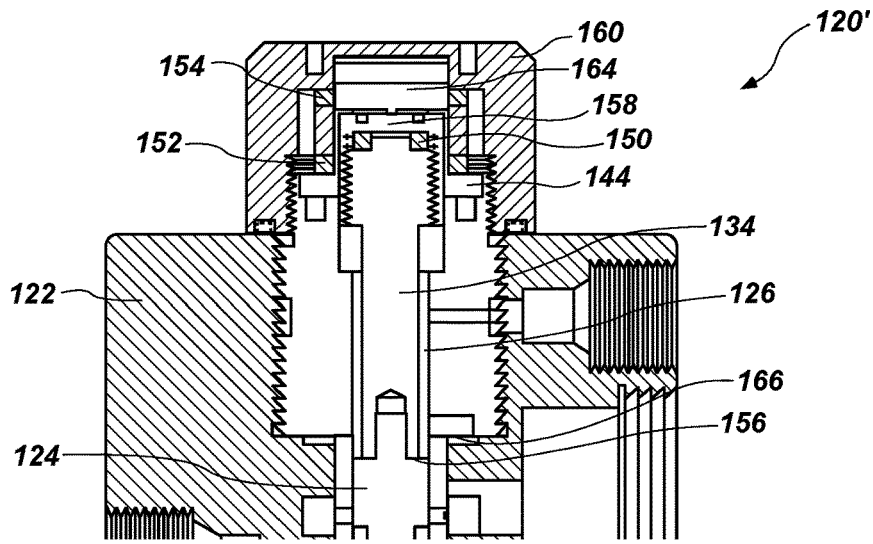
FIGS. 3B through 3D are cross-sectional views of a portion of the shuttle valve of FIG. 3A illustrating the shuttle spool shown in a variety of positions within a body of the shuttle valve.
Figure 3C:
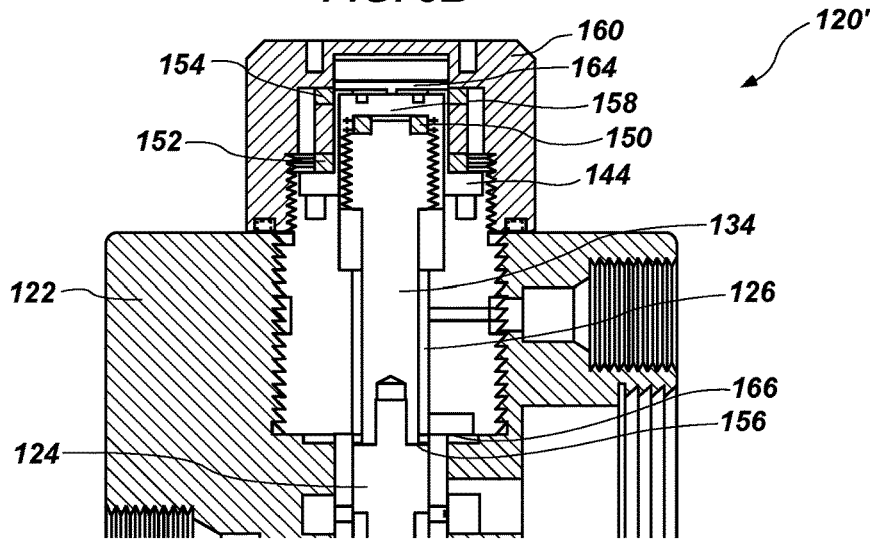
Figure 3D:
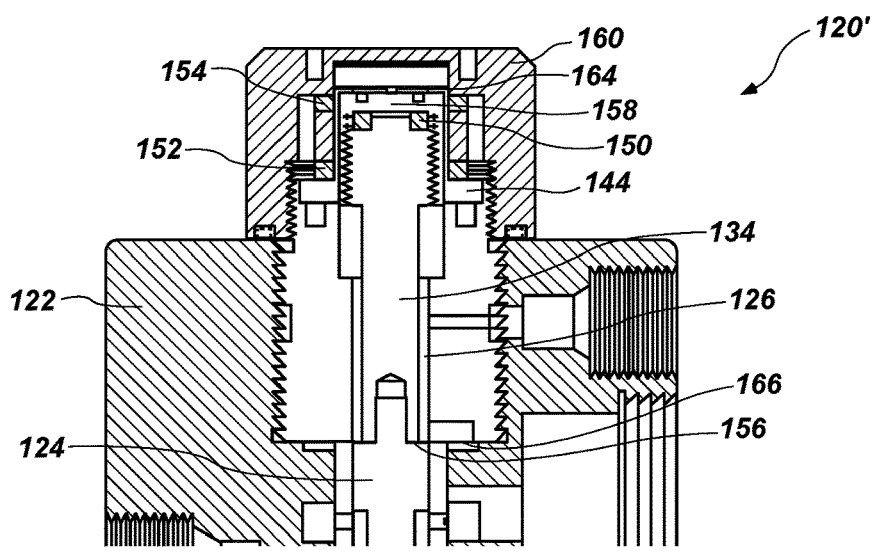

FIGS. 3B through 3D are cross-sectional views of a portion of the shuttle valve 120' of FIG. 3A illustrating the shuttle spool 124 in a variety of positions within the shuttle valve body 122 at various stages of the cycle of movement, similar to that shown in the embodiment of FIGS. 2B through 2D, as the shuttle spool 124 slides back and forth within the shuttle valve body 122.

As shown in FIG. 3B, the position of the first magnetic device 150 is relatively closer to a position of the second magnetic device 152 than a position of the third magnetic device 154 when the shuttle spool 124 is down (e.g., at the lower end of the movement thereof). In particular, when the position of the first magnetic device 150 is relatively closer to that of the second magnetic device 152, a magnetic force (e.g., repulsive force) acts between the first magnetic device 150 and the second magnetic device 152, which force, in turn, is applied to the shuttle spool 124. At this stage, the shoulder region 156 of the shuttle spool 124 may be longitudinally offset from (e.g., below) the shoulder region 166 of the shuttle valve body 122 by a greater distance than that associated with the stage shown in FIG. 3A, and the gap within the recess 164 of the outer cap 160 between the upper surface of the inner cap 158 and the lower surface of the support structure 144 is increased, as shown in FIG. 3B.

As shown in FIG. 3C, the position of the first magnetic device 150 is relatively closer to a position of the third magnetic device 154 than a position of the second magnetic device 152 when the shuttle spool 124 is at the center position. At this stage, the magnetic force acts between the first magnetic device 150 and the third magnetic device 154 to deter (e.g., prevent) the shuttle spool 124 from stalling at the center position. In other words, the first magnetic device 150, in combination with the second magnetic device 152 and the third magnetic device 154, may be used to create the magnetic force therebetween to destabilize the shuttle spool 124 when located at or proximate the center position in order to reduce (e.g., substantially eliminate) occurrences of stalling of the shuttle spool 124. At this stage, a distance between the shoulder region 156 of the shuttle spool 124 and the shoulder region 166 of the shuttle valve body 122 may be decreased, and the gap within the recess 164 of the outer cap 160 between the upper surface of the inner cap 158 and the lower surface of the support structure 144 is also decreased, as shown in FIG. 3C.

As shown in FIG. 3D, the position of the first magnetic device 150 is relatively closer to a position of the third magnetic device 154 than a position of the second magnetic device 152 by an increased amount when the shuttle spool 124 is above the center position (e.g., at the upper end of the movement thereof). At this stage, the magnetic force acts between the first magnetic device 150 and the third magnetic device 154, resulting in an applied force to the shuttle spool 124. At this stage, the shoulder region 156 of the shuttle spool 124 may be substantially aligned with the shoulder region 166 of the shuttle valve body 122, and the gap within the recess 164 of the outer cap 160 between the upper surface of the inner cap 158 and the lower surface of the support structure 144 is further decreased (e.g., absent), as shown in FIG. 3D.

Figure 4:
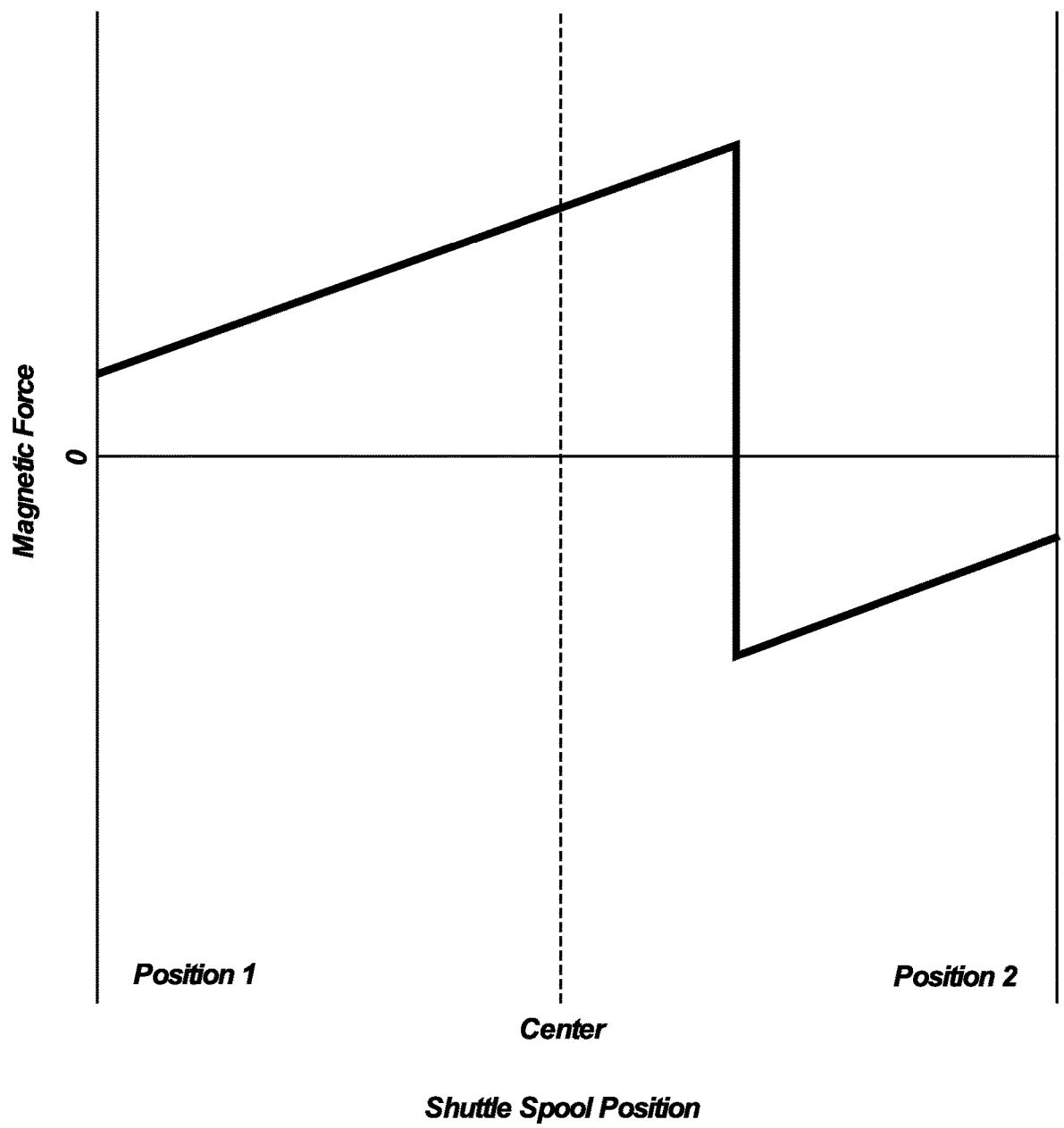
FIG. 4 is a simplified graph illustrating magnetic forces as the shuttle spool cycles between opposing positions.

FIG. 4 is a simplified graph illustrating magnetic forces (e.g., repulsive forces) between two or more magnetic devices (e.g., the first magnetic device 150 and the second magnetic device 152) as the shuttle spool 124 cycles between the first position and the second position. As shown in FIG. 4, the magnetic forces may be a non-zero amount in the positive direction, for example, when the shuttle spool 124 is at the first position (shown as Position 1) and the magnetic forces may be a non-zero amount in the negative direction when the shuttle spool 124 is at the second position (shown as Position 2). As the shuttle spool 124 moves from the first position to the second position, the magnetic forces increase (e.g., substantially linearly) until the magnetic devices are in a neutral position (e.g., perfectly laterally aligned), as shown at the stage depicted in FIG. 2A. At the neutral position, the first magnetic device 150 and the second magnetic device 152 are centered with one another such that there is zero net force acting therebetween. At this stage, there is no magnetic force applied to the shuttle spool 124, as described in greater detail with reference to FIG. 2A. Thus, the zero net force of the magnetic forces occurs when the shuttle spool 124 is off center, as depicted by the location of the dashed line in FIG. 4. After the first magnetic device 150 and the second magnetic device 152 pass through the neutral position relative to one another, magnetic forces therebetween increase as the shuttle spool 124 approaches the second position such that the magnetic forces are a non-zero amount in the negative direction when the shuttle spool is in the second position, as shown in FIG. 4.

Thus, when the shuttle spool 124 is at a center position, as shown and described with reference to FIG. 2C, the magnetic force acts therebetween to deter (e.g., prevent) the shuttle spool 124 from stalling at the center position. In other words, the first magnetic device 150 and the second magnetic device 152 may be used to create the magnetic force therebetween to destabilize the shuttle spool 124 when located at or proximate the center position in order to reduce (e.g., substantially eliminate) occurrences of stalling of the shuttle spool 124. In such an embodiment, a fluid pressure of the pneumatic fluid is at a non-zero amount when the magnetic devices are at a neutral position (e.g., a zero net force), such that ongoing pressure (e.g., air pressure) continues to push the shuttle spool 124 when the magnetic devices are in the neutral position. In other words, when the air pressure switches from one direction to another (e.g., at a zero point) such that the shuttle spool 124 is at the center position (e.g., midway between the first position and the second position), the magnetic force acting between the magnetic devices is non-zero in order to prevent the shuttle spool 124 from stalling at the center position. Although the graph of FIG. 4 is described with reference to the embodiment of FIGS. 2A through 2D including two magnetic devices, the magnetic forces as shown in FIG. 4 may similarly be described with reference to the embodiment of FIGS. 3A through 3D including three magnetic devices.

Such shuttle valves including magnetic devices (e.g., magnets) as disclosed herein may have certain advantages over conventional shuttle valves and associated shuttle spools. For example, providing a magnetic field using one or more magnets that are configured to bias the shuttle spool away from the center position within a body of the shuttle valve may prevent stall occurrences of the shuttle spool. In particular, positioning the shuttle spool below the center position thereof when two or more magnets are centered (e.g., zero net force) and longitudinally offsetting the magnets when the shuttle spool is at a center position provides a repulsive force between the magnets, which results in the shuttle spool being destabilized such that the shuttle spool is deterred (e.g., prevented) from stopping at the center position and is pushed toward one of the first position or the second position. Further, forces (e.g., magnetic repulsive forces) required to deter the shuttle spool from stopping at the center position may be less than such forces required to push the shuttle spool toward the first position and/or the second position. Providing such shuttle valves including magnets may increase efficiencies of the shuttle valve during operation, thereby increasing the efficiency of an associated reciprocating fluid pump.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventors.

What is claimed is:

1. A reciprocating fluid pump comprising:
   a shuttle valve comprising:
      a valve body;
      a spool disposed within the valve body and configured to move between a first position and a second position within the valve body; and
      a positioning magnet assembly proximate a longitudinal end of the valve body, the positioning magnet assembly comprising a permanent magnet carried by the spool and at least one stationary magnetic device on the valve body, wherein the permanent magnet is configured to interact with the at least one stationary magnetic device to impart a magnetic force on the spool in a direction along a longitudinal axis of the valve body,
      wherein the permanent magnet is located and configured such that the spool is positioned away from a neutral position between the first position and the second position when the permanent magnet is aligned with the at least one stationary magnetic device at a position along the longitudinal axis of the spool and there is no magnetic force between the permanent magnet and the at least one stationary magnetic device, and
      wherein the permanent magnet is located and configured to impart a non-zero magnetic force on the spool when the spool is proximate the neutral position such that the spool is prevented from stopping at the neutral position.

2. The reciprocating fluid pump of claim 1, wherein the shuttle valve comprises a control rod located between the permanent magnet and the spool, a protrusion of the spool securely engaged within a recess on a lower surface of the control rod, and the permanent magnet comprising a central aperture engaging a protrusion on an upper surface of the control rod.

3. The reciprocating fluid pump of claim 1, wherein the shuttle valve comprises an outer cap secured to the longitudinal end of the valve body, the outer cap configured to enclose the permanent magnet of the positioning magnet assembly.

4. The reciprocating fluid pump of claim 3, wherein the at least one stationary magnetic device comprises two permanent annular magnets held in position proximate the longitudinal end of the valve body by the outer cap.

5. The reciprocating fluid pump of claim 4, wherein a polarity of each of the permanent magnet and the two permanent annular magnets are aligned in the same direction.

6. The reciprocating fluid pump of claim 4, wherein the permanent magnet is positioned off center between the two permanent annular magnets when the spool is at the neutral position between the first position and the second position.

7. The reciprocating fluid pump of claim 1, wherein the at least one stationary magnetic device comprises two electromagnetic devices spaced apart from one another at a distance greater than a height of the permanent magnet such that the permanent magnet does not extend beyond the two electromagnetic devices during movement of the spool within the valve body.

8. A reciprocating fluid pump, comprising:
   a pump body;
   at least one subject fluid chamber within the pump body;
   at least one drive fluid chamber within the pump body; and
   a shuttle valve for shifting flow of pressurized drive fluid between at least two conduits, at least one conduit of the at least two conduits leading to the at least one drive fluid chamber, the shuttle valve comprising:
      a valve body;
      a spool disposed within the valve body and configured to move between a first position and a second position within the valve body; and
      at least one magnet carried by the spool and at least one additional magnet on the valve body, the at least one magnet located and configured to impart a force on the spool responsive to a magnetic field such that the force is applied when the spool is positioned at or proximate a midpoint between the first position and the second position, and the spool is positioned at a location other than the midpoint when the at least one magnet is aligned with the at least one additional magnet at a position along a longitudinal axis of the spool and there is substantially no net force between the at least one magnet and the at least one additional magnet.

9. The reciprocating fluid pump of claim 8, wherein the shuttle valve comprises a control rod carried by the spool, the at least one magnet comprising at least one annular magnet centered around a protrusion on an upper surface of the control rod.

10. The reciprocating fluid pump of claim 9, wherein the shuttle valve comprises an inner cap threadably engaged with the control rod and an outer cap attached to the valve body of the shuttle valve, the at least one magnet located between the control rod and the inner cap.

11. The reciprocating fluid pump of claim 8, wherein the at least one magnet is located and configured to impart the force on the spool responsive to the magnetic field when the spool is at the midpoint at substantially equal distances from the first position and the second position such that the spool is prevented from stopping at the midpoint.

12. The reciprocating fluid pump of claim 8, wherein the at least one additional magnet is located and configured to provide the magnetic field acting on the at least one magnet.

13. The reciprocating fluid pump of claim 8, wherein the at least one additional magnet comprises a single annular magnet located on a support structure of the valve body, the spool being positioned below the midpoint when the at least one magnet is aligned with the at least one additional magnet at the position along the longitudinal axis of the spool.

14. The reciprocating fluid pump of claim 8, wherein the spool is positioned at the midpoint when a position of the at least one magnet is longitudinally offset from a position of the at least one additional magnet along the longitudinal axis of the spool.

15. The reciprocating fluid pump of claim 8, wherein the at least one additional magnet comprises two annular magnets, the at least one magnet not extending beyond either of the two annular magnets in a direction along the longitudinal axis of the spool.

16. The reciprocating fluid pump of claim 8, wherein each of the at least one magnet and the at least one additional magnet is a permanent magnet.

17. The reciprocating fluid pump of claim 8, wherein the at least one additional magnet is an electromagnetic device.

18. A method of operating a shuttle valve of a reciprocating fluid pump comprising:
providing a magnetic field between a valve body of the shuttle valve and a spool disposed within the valve body, the spool configured to move between a first position and a second position within the valve body; and
imparting a magnetic force to a first magnet carried by the spool using at least one additional magnet attached to the valve body such that a non-zero magnetic force is imparted on the spool when there is no air pressure applied to the spool, and a non-zero amount of air pressure is applied to the spool when the first magnet and the at least one additional magnet are aligned with one another at a position along a longitudinal axis of the spool and there is substantially no magnetic force between the first magnet and the at least one additional magnet.

19. The method of claim 18, wherein the first magnet and the at least one additional magnet are aligned with one another at the position along the longitudinal axis of the spool when the spool is below a center position midway between the first position and the second position.

20. The method of claim 18, wherein imparting the magnetic force to the first magnet using the at least one additional magnet comprises imparting a repulsive force between the first magnet and the at least one additional magnet, a magnitude of the repulsive force increasing as the first magnet and the at least one additional magnet are brought into proximity with one another.

* * * * *